US009897626B2

(12) United States Patent
Tabak et al.

(10) Patent No.: US 9,897,626 B2
(45) Date of Patent: Feb. 20, 2018

(54) SCANNING PROBE MICROSCOPE WITH A REDUCED Q-FACTOR

(71) Applicant: Nederlandse Organisatie voor toegepast-natuurwetenschappelijk onderzoek TNO, 's-Gravenhage (NL)

(72) Inventors: Femke Chantal Tabak, 's-Gravenhage (NL); Hamed Sadeghian Marnani, '-Gravenhage (NL); Maarten Hubertus van Es, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/517,063

(22) PCT Filed: Oct. 5, 2015

(86) PCT No.: PCT/NL2015/050699
§ 371 (c)(1),
(2) Date: Apr. 5, 2017

(87) PCT Pub. No.: WO2016/056903
PCT Pub. Date: Apr. 14, 2016

(65) Prior Publication Data
US 2017/0307655 A1 Oct. 26, 2017

(30) Foreign Application Priority Data
Oct. 6, 2014 (EP) .................................... 14187831

(51) Int. Cl.
*G01Q 10/06* (2010.01)
*G01Q 70/04* (2010.01)
*G01Q 30/18* (2010.01)

(52) U.S. Cl.
CPC ............. *G01Q 70/04* (2013.01); *G01Q 30/18* (2013.01)

(58) Field of Classification Search
CPC ........ G01Q 20/02; G01Q 20/04; G01Q 30/14; G01Q 60/38; G01Q 70/04; G01Q 70/14; B82Y 35/00
See application file for complete search history.

(56) References Cited

U.S. PATENT DOCUMENTS

| 5,982,497 A | 11/1999 | Hopkins | |
|---|---|---|---|
| 2007/0024295 A1* | 2/2007 | Humphris | G01Q 60/38 324/754.17 |

(Continued)

FOREIGN PATENT DOCUMENTS

| WO | 2013010272 A1 | 1/2013 |
|---|---|---|
| WO | 2013173541 A1 | 11/2013 |

*Primary Examiner* — David E Smith
*Assistant Examiner* — Hsien Tsai
(74) *Attorney, Agent, or Firm* — Hoffmann & Baron, LLP (57) ABSTRACT

A scanning probe microscope is provided comprising a scanning probe (10), a holder (5) for holding a sample (SMP) in an environment free from liquid. A scanning arrangement (20) is provided therein for inducing a relative motion of the scanning probe (10) with respect to said sample (SMP) along a surface of the sample (SMP). A driver (30) generates a drive signal (Sd) to induce an oscillating motion of the scanning probe (10) relative to the surface of the sample to be scanned. A measuring unit (40) measure a deflection of the scanning probe (10), and provides a deflection signal (Sδ) indicative for said deflection. An amplitude detector (50) detects an amplitude of the oscillating motion as indicated by the deflection signal (Sδ) and provides an amplitude signal (Sa) indicative for the amplitude. The scanning probe (10) is at least partly arranged in a liquid (L) to dampen motion of said scanning probe, and therewith has a quality factor Q which is less than or equal than 5. The (Continued)

scanning probe (10) is accommodated in a casing (90) comprising said liquid (L), the scanning probe (10) comprising a flexible carrier (11), the flexible carrier having a movable part provided with a tip (12), which tip (12) extends through an opening (91) in said casing.

7 Claims, 6 Drawing Sheets

(56) References Cited

U.S. PATENT DOCUMENTS

| 2013/0125269 A1* | 5/2013 | Su ......................... | G01Q 30/00 |
| | | | 850/8 |
| 2014/0250553 A1* | 9/2014 | Ziegler ................ | B82Y 35/00 |
| | | | 850/56 |

* cited by examiner

TOPOGRAPHICAL IMAGE

ERROR IMAGE

Feedback off ⟶

Feedback on ⟶

FIG. 7C

SCANNING PROBE MICROSCOPE WITH A REDUCED Q-FACTOR

This application is the U.S. National Phase of, and Applicants claim priority from, International Patent Application Number PCT/ NL2015/050699 filed 5 Oct. 2015, which claims priority from EP 14187831.4 filed 6 Oct. 2014, each of which is incorporated herein by reference.

BACKGROUND OF THE INVENTION

Field of the Invention

The present invention relates to an scanning probe microscope. The present invention further relates to a method of operating an scanning probe microscope.

Related Art

Scanning probe microscopes (SPM), such as Atomic Force Microscopes (AFM) are widely used for the physical characterization of materials and devices when high spatial resolution and small feature sizes are of interest. AFMs are primarily used in imaging modes to provide topographic information, but they can also record the force between a probe tip and a sample. In AFM, the probe tip is typically positioned on a cantilever spring, which serves as a flexible carrier that translates force in bending or displacement. Other flexible carriers may also be used for this purpose instead of a cantilever spring, such as diaphragms or double clamped beams. Movement of the flexible carrier is typically measured using an optical beam deflection setup, although different read-out schemes also exist. In the following description the wording 'cantilever' is used as a particular example of a flexible carrier. The disclosure is however equally applicable to embodiments using another type of flexible carrier, as suggested above.

In the common imaging mode 'Amplitude Modulation' AFM (also called 'tapping mode', 'AC mode' or 'intermittent contact mode'), the cantilever is oscillated at or near its resonance frequency. The amplitude of this oscillation is reduced by the force between tip and surface and is measured and used as input for a feedback system which adjusts the height of the tip such that the amplitude remains constant. When the tip is scanned over the surface, the topographical variations between positions continuously change the amplitude which the feedback then corrects for. The speed of correction is limited by a number of factors, including the cantilever response time and the speed at which the cantilever can be mechanically repositioned.

Cantilever response time is determined by the cantilever resonance frequency and damping or Q factor. In this connection people have worked both at increasing the resonance frequency and decreasing the Q factor to speed up AFM imaging. The first mention in literature of reducing Q for enhanced speed is Mertz et al. in "Regulation of a microcantilever response by force feedback", *Applied Physics Letters,* 1993, 62, 2344, which introduces the idea to feed back the measured cantilever motion in an external drive signal to reduce Q. Other schemes have been developed to reduce Q too, for example, Fairbairn et al. describes the use of an active impedance in a piezoelectric shunt control framework in "Sensorless Implementation of a PPF Controller for Active Q Control of an AFM Microcantilever", IEEE TRANSACTIONS ON CONTROL SYSTEMS TECHNOLOGY. Fairbairn compares results achieved with a quality factor Q of 226 and with a reduced cantilever Q factor of 17 and concludes that reducing the cantilever Q factor with active piezoelectric shunt control allows for improved image quality at high scan speeds.

It is noted that US20070024295 discloses a probe for an atomic force microscope is adapted such that, as a sample is scanned, it experiences a biasing force urging the probe towards the sample. This improves probe tracking of the sample surface and faster scans are possible. This is achieved by either including a biasing element which is responsive to an externally applied force, on the probe and/or reducing the quality factor of a supporting beam. The quality factor may be reduced by coating the beam with a mechanical-energy dissipating material. It is a disadvantage of this known probe that the coating causes a relatively substantial mechanical stress and therewith a distortion of the beam. Moreover, this mechanical stress and resulting distortion depend on external circumstances, such as temperature, which render the probe less accurate. Also non-uniformities and defects in the coating can easily result in deviations of the mechanical properties of the probe.

It is an object of the present invention to provide for an improved image quality at high scan speeds or to enable an increase of the scan speed while maintaining image quality by reducing the Q factor of the probe, while avoiding that this results in deviations of its other mechanical properties.

SUMMARY OF THE INVENTION

According to a first aspect of the present invention a scanning probe microscope is provided that comprises:

a scanning probe comprising a flexible carrier, the flexible carrier having a movable part provided with a tip;

a holder to hold a sample in an environment free from liquid;

a scanning arrangement to induce a relative motion of said scanning probe with respect to said sample along a surface of said sample;

a driver to generate a drive signal to induce an oscillating motion of said scanning probe relative to said surface, a measuring unit to measure a deflection of the scanning probe, and to provide a deflection signal indicative for said deflection;

an amplitude detector to detect an amplitude of said oscillating motion as indicated by the deflection signal and to provide an amplitude signal indicative for said amplitude.

The scanning probe is accommodated in a casing comprising a liquid to dampen motion of said scanning probe, the uncontrolled scanning probe therewith having a quality factor Q which is less than or equal than 5, the tip of said scanning probe extending through an opening in said casing.

According to a second aspect of the present invention, a method of operating a scanning probe microscope is provided that comprising:

Accommodating a scanning probe in a casing comprising a liquid to dampen motion of said scanning probe, the uncontrolled scanning probe therewith having a quality factor Q which is less than or equal than 5, the scanning probe comprising a flexible carrier, the flexible carrier having a movable part provided with a tip, which tip extends through an opening in said casing;

holding a sample in an environment free from liquid;

inducing a relative motion of a scanning probe with respect to a sample along a surface of said sample;

inducing an oscillating motion of said scanning probe relative to said surface;

measuring a deflection of the scanning probe;

detecting an amplitude of said oscillating motion as indicated by the deflection signal.

In the method and the apparatus according to the present invention, the liquid in which the scanning probe is arranged provides for a substantial damping of the scanning probe. I.e. the liquid damped scanning probe has quality factor Q which is less than or equal than 5. This enables a fast response. Due to the presence of the liquid in which the probe is arranged a additional dampening coating of the probe is superfluous, therewith avoiding an increase in mechanical stress and unpredictable variations in other mechanical properties. It is noted that application of scanning probe microscopy is known wherein the sample is immersed in a liquid for protection. For an important class of applications, e.g. inspection of nanostructured products such as wafers or masks in the semiconductor industry these known devices are however unsuitable. Contact between a liquid, possibly including contaminations dissolved therein, is typically harmful to such products. Accordingly, in the apparatus and method as claimed the sample is maintained in an environment free from liquid. The flexible carrier is for example a cantilever having the tip provided on a free end. Alternatively, the flexible carrier may be diaphragm having the tip provided in a central position of its surface, or a double clamped beam having the tip arranged in a central position between its ends. The casing around the cantilever further enhances damping and therewith makes it possible to reduces the Q factor more than would be possible when the cantilever were not encased.

It is noted that use of encased cantilevers is known wherein the casing is filled with a gas. These serve to avoid contact of the cantilever with a liquid wherein the sample is arranged and not to dampen the cantilever. In order to sufficiently dampen the cantilever by the gas in such an arrangement it would be necessary to dimension the cantilever with small distances between the edges of the cantilever and the casing. Minor deviations in these distances would already result in substantial deviations in the desired damping.

If desired an additional damping by other means may be applied, e.g. by active damping.

For relatively small scanning area of the sample, it may suffice to keep the scanning probe positioned at a fixed absolute position. It may further be contemplated to adapt the tip oscillation amplitude in response to an observed relative position between the surface and the probe. Note that the present invention also increases the speed with which this adjustment can be made.

An embodiment of the scanning probe microscope according to the first or second aspect further comprises a positioning unit for positioning said scanning probe in a direction transverse to said surface. This facilitates scanning of larger areas and/or tolerates larger misalignments of the sample.

In an embodiment of this embodiment a feedback unit is included to provide a control signal for controlling said positioning unit in order to minimize deviations in an amplitude of oscillating motion based on said amplitude signal and a reference signal.

Typically the amplitude of this oscillation is reduced by the force between tip and surface and is measured and used as input for the feedback unit, which adjusts the height of the tip such that the amplitude remains constant.

Various signals involved may be used to render an image of the sample surface.

For example, in an embodiment, the control signal determining the height of the probe, can be used to render the topography image. The input for the feedback, the amplitude of the tip, denoted as the amplitude signal or the error signal can be used to render a difference image.

The oscillating motion of the scanning probe may be imposed in various ways. Most common is to shake its support, for example by dither piezo. This will work but might also shake the casing and therefore make the cantilever response more complex as the motions couple through the liquid.

Alternatively, the cantilever can be driven directly, e.g. magnetically (after integrating a magnet or magnetic layer) or piezoelectrically (after integrating a piezoelectric layer) or optically (heating and using the bilayer [bimetal] effect) or by other methods that directly actuate the cantilever. These methods to drive the cantilever are preferred, as they act directly on the cantilever and do not excite other structures.

Water may be used as the liquid inside the casing. This is advantageous in that it is chemically inert, has relatively high surface tension causing it to be confined in the casing as well as a relatively low evaporation rate. Also other liquids may be contemplated, such as oils, aceton, IPA. In some cases a surface of the opening for the tip facing the liquid may be prepared to have a relatively high surface tension for said liquid, to enhance confinement of the liquid in the casing.

In an embodiment of the scanning probe microscope having the encased cantilever, the casing includes a second opening for insertion of the liquid, for example to compensate for evaporation of the liquid.

It could still further be contemplated to dimension the cantilever in a manner that further enhances damping by the liquid in which it is arranged. This may be achieved for example by increasing its width. A reduction of its resonance frequency would not be a problem, as long it remains high enough to avoid a limitation on the resolution with which the surface can be scanned. The upper limit in this respect is determined by the scanning speed divided by the resonance frequency.

BRIEF DESCRIPTION OF THE DRAWINGS

These and other aspects are described in more detail with reference to the drawing. Therein.

DETAILED DESCRIPTION OF EMBODIMENTS

Like reference symbols in the various drawings indicate like elements unless otherwise indicated.

Figure 1:
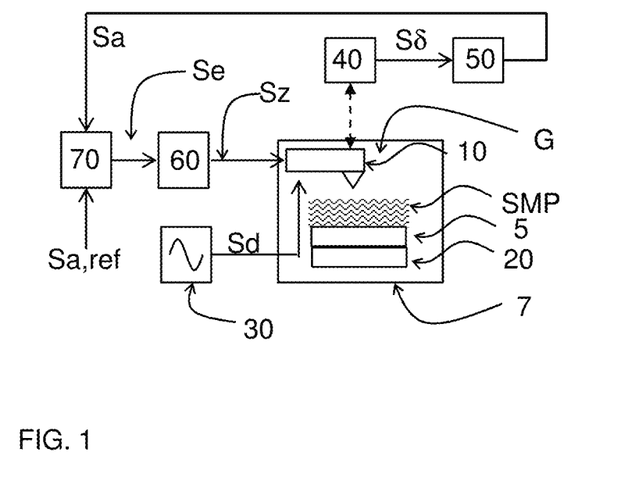
FIG. 1, 1A show embodiments of a scanning probe microscope according to the first aspect of the invention.
Figure 2A:
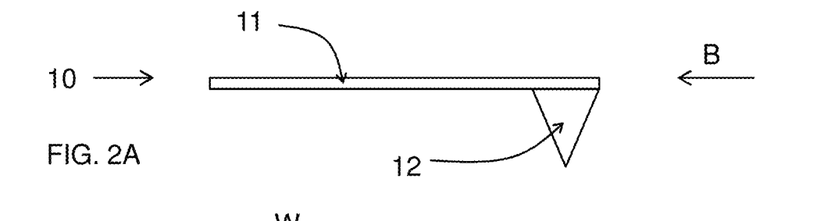
FIG. 2A, 2B show views of a part of an embodiment of a scanning probe microscope according to the first aspect of the invention.
Figure 2B:
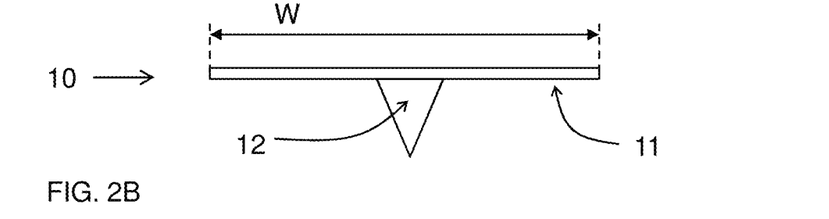

FIG. 1 schematically illustrates scanning probe microscope comprising a scanning probe 10 for scanning a sample SMP. In the embodiment shown the scanning probe 10 is formed as a cantilever 11 provided with a tip 12, as shown in FIG. 2A, 2B. Therein FIG. 2A shows a side view and FIG. 2B shows a front view of the scanning probe according to B in FIG. 2A. A holder 5 is provided for holding a sample SMP in an environment free from liquid. In the embodiment shown the sample SMP and the scanning probe are arranged in a housing 7 that can be filled with a gas G. A scanning arrangement 20 is provided for inducing a relative motion of the scanning probe 10 with respect to said sample SMP arranged on the holder 5. In this way the probe 10 can be scanned along a surface of the sample SMP. Various implementations are possible. The scanning arrangement 20 may keep the sample SMP stationary and move the probe 10 over the surface of the sample SMP. Alternatively, the scanning arrangement may keep the probe 10 at a fixed position and move the sample. Again alternatively the scanning arrangement 20 may provide for said relative motion by moving both the scanning probe 10 and the sample SMP. For example, the scanning arrangement 20 may move the scanning probe 10 along a first direction and the sample SMP along a second direction transverse to the first direction.

The scanning probe microscope further includes a driver 30 to generate a drive signal Sd to induce an oscillating motion of the scanning probe 10 relative to the surface of the sample SMP. Typically, this oscillating motion is performed in a direction transverse to the surface of the sample SMP, however alternative embodiments are possible wherein the oscillating motion is performed in a direction parallel to the surface instead.

A measuring unit 40 is provided to measure a deflection of the scanning probe 10, and to provide a deflection signal $S_\delta$ indicative for said deflection. Various techniques are suitable for this purpose, including capacitive, self-sensing techniques based on piezoelectric or piezoresistive effects, interferometry and optical beam deflection.

An amplitude detector 50 is provided to detect an amplitude of the oscillating motion as indicated by the deflection signal $S_\delta$. In response the amplitude detector 50 provides an amplitude signal Sa indicative for this amplitude.

Figure 3:
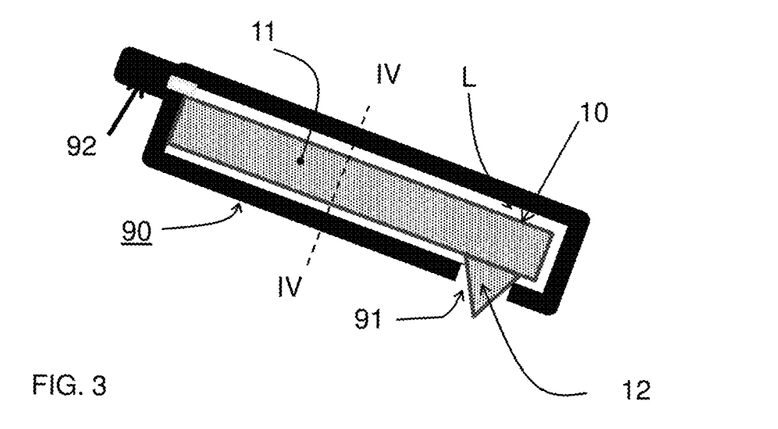
FIG. 3 shows a cross-section of a part of another embodiment of a scanning probe microscope according to the first aspect of the invention.
Figure 4:
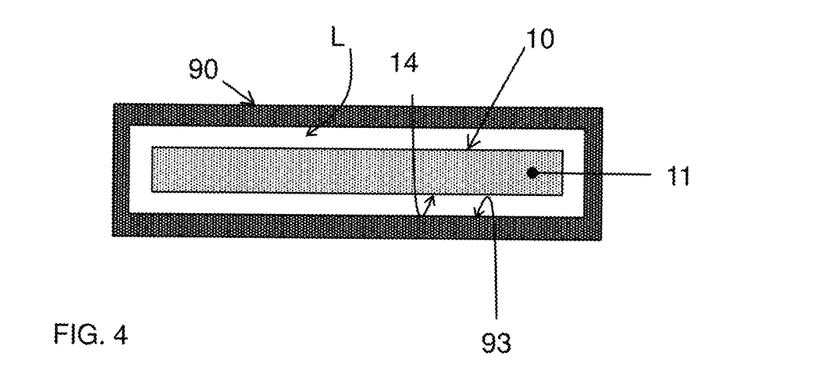
FIG. 4 shows a cross-section according to Iv-Iv in FIG. 3.

In the embodiment shown the scanning probe microscope further comprises a positioning unit 60 that positions the scanning probe 10 in a direction transverse to the surface of the sample SMP. To that end it issues a control signal Sz to a positioning actuator (not shown). More specifically the scanning probe microscope as shown also comprises a feedback unit 70 to provide a control signal Se for controlling the positioning unit 60. The feedback unit 70 is arranged to minimize deviations in an amplitude of the oscillating motion of the scanning probe 10 based on the amplitude signal Sa and a reference signal Sa, ref that is representative for a desired amplitude of the oscillating motion. As shown in FIGS. 3 and 4, the scanning probe 10 is accommodated the casing 90 with liquid L. Therein FIG. 4, is the cross-section IV-IV of FIG. 3.

Figure 1A:
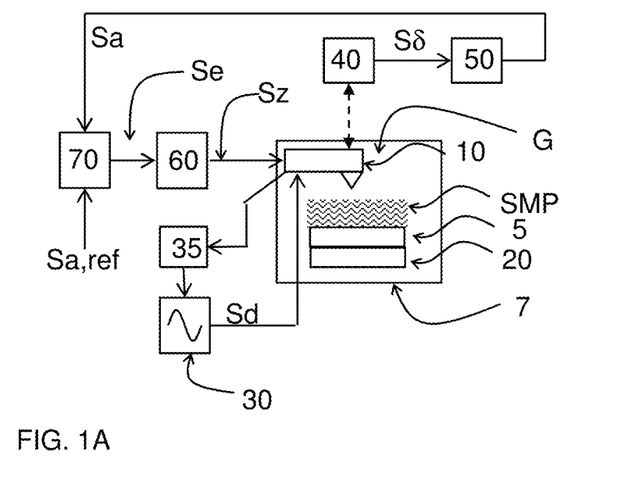

The liquid L in the casing 90 in which the scanning probe 10 is arranged dampens its motion. Therewith a quality factor Q of the scanning probe in an uncontrolled state is less than or equal than 5. The wording "uncontrolled state" is used to indicate that the presence of the liquid L alone already provides for this damping. Additionally the feedback system may provide for a further damping by electronic control means, as schematically shown in FIG. 1A.

Figure 1B:
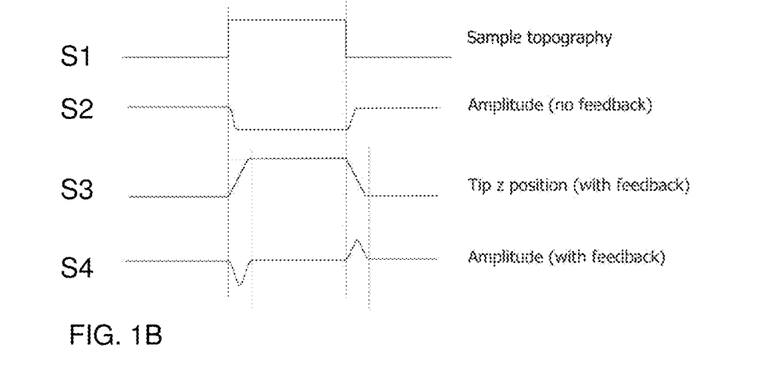
FIG. 1B shows various variables, illustrating its operation.

Various signals involved may be used to render an image of the sample surface, as illustrated by FIG. 1B. Therein S1 schematically represents a profile of a sample surface along line to be scanned by the probe.

The signal S2 shows the intrinsic response of the probe, i.e. the amplitude of its tip in case the probe is maintained at a fixed height with respect to the scanning plane.

Signal S3 shows the height of the probe in case a feedback control is provided.

Signal S4 shows the amplitude in case a feedback control is provided.

The control signal S3 (Sz in FIG. 1, 1A), determining the height of the probe, can be used to render a topography image. The input for the feedback, the amplitude S4 (Sa in FIG. 1, 1A) of the tip, is denoted the amplitude signal or the error signal.

Figure 7A:
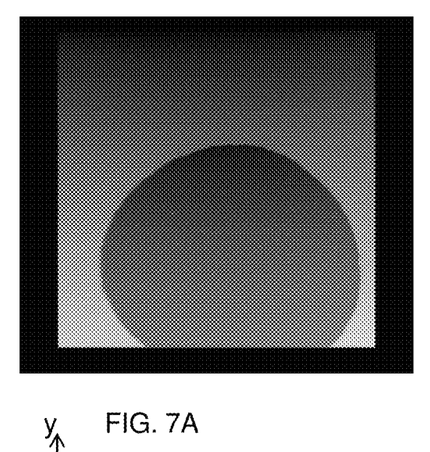
FIG. 7A-C illustrates exemplary results that can be obtained.
Figure 7B:
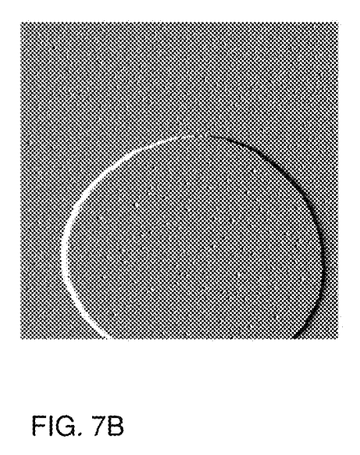
Figure 7C:
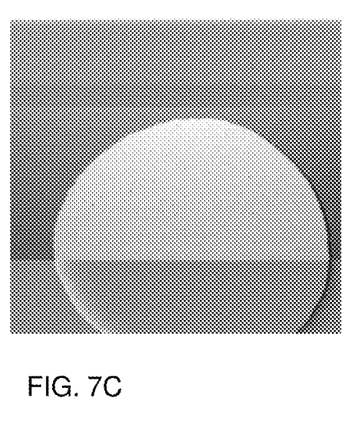

FIG. 7A-7C illustrates images obtained with these signals. Therein FIG. 7A shows the topographical image obtained with signal S3. FIG. 7B shows the error image obtained with S4. The upper and the lower part of FIG. 7C respectively illustrates the image obtained with the amplitude signal S2 (no feedback) and S4 (with feedback). It is noted that this image is obtained at a higher scanning speed and with a different color mapping, than that used for the image 7B.

As further shown in FIGS. 3 and 4, the scanning probe 10 comprises a cantilever 11 having a free end provided with a tip 12 extending through an opening 91 in the casing 90. The liquid L in the casing around the cantilever provides for a well controllable damping and therewith makes it possible to reduce the Q factor more than would be possible when the cantilever were not encased.

FIG. 1A schematically shows an embodiment that includes a control module 35 to provide for an additional damping by electronic means. Part in FIG. 1A corresponding to those in FIG. 1 have the same reference. To this end the control module 35 may receive phase information from a piezo-electric layer on the cantilever, but alternatively the signal $S\delta$ from the measuring unit 40 may be used.

As shown in FIG. 3 the cantilever 11 has a free end provided with a tip 12 that extends through an opening 91 of the casing 90.

As shown in FIG. 3 the casing 90 includes a second opening 92 for insertion of the liquid L. The second opening 92 is arranged here at an end of the casing 90 opposite the free end.

The casing 90 confines the liquid L, so that the holder 5 can hold the sample SMP in an environment free from liquid. A liquid L can be confined in the casing 90 if the opening 91 is sufficiently small. In practice capillary action (determined by the surface tension of the liquid L (e.g. water) will be sufficient to confine the liquid L inside the casing. This is determined by a combination of a negative surface tension of the liquid with respect to the casing and a positive surface tension of the liquid with respect to air in the environment. Some evaporation could occur dependent on the size of the opening 91 for the tip 12 and on the distance of the liquid L surface to the opening. However due to the small cross-sections involved it is expected that loss of liquid by diffusion and/or evaporation is negligible in the normal lifetime of a probe. Nevertheless, in an embodiment an inner surface of the casing 90 near the opening 91 that faces the liquid L may have a relatively large positive surface tension for said liquid in comparison to a remainder of said inner surface. Therewith the liquid is repelled near the opening 91 and attracted towards the remainder of the inner surface.

Figure 5A:
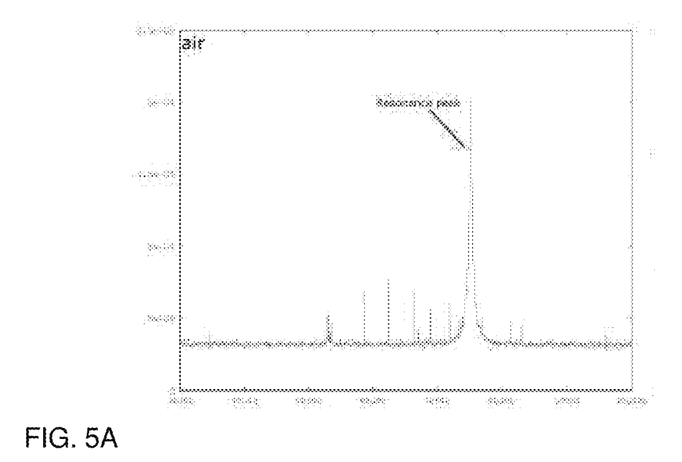
FIG. 5A shows measurements of a frequency spectrum of a part of a scanning probe microscope not according to the invention.

In an experimental setting the influence of damping on cantilever dynamics and maximum sensible pixel rate in Atomic Force Microscopy was characterized. The cantilever used was a BudgetSensors Multi75-G with manufacturers specifications: $f_0$=75 kHz, k=3 N/m, l×w×h=225×28×3 µm fabricated from silicon with an aluminum reflex coating. Measurements were performed in water with a fully submerged cantilever and in air to obtain the Q factor, as a measure of the cantilever damping, in both conditions. To that end thermal motion spectra were obtained, as shown in FIG. 5A for air and in FIG. 5B for water. The spectra revealed for this cantilever the following results.

Figure 5B:
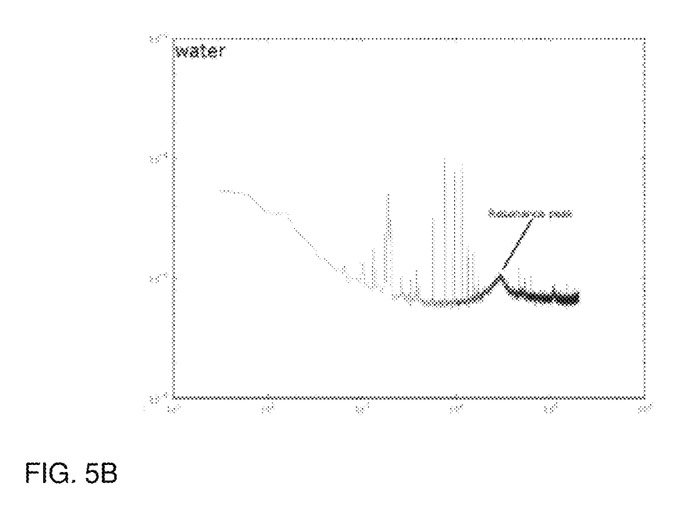
FIG. 5B shows measurements of a frequency spectrum of a part of scanning probe microscope according to the first aspect of the invention.

| fluid | $f_0$ (kHz) | Q | $\tau = Q/\pi f_0$ (ms) |
|---|---|---|---|
| air | 75 | 140 | 0.594 |
| water | 30 | 3 | 0.032 |

The table indicates apart from the damped resonance frequency ($f_0$) and the quality factor Q, also the response time τ.

The experiment reveals that the response time τ can be substantially reduced by reduction of the quality factor Q of the cantilever caused by damping in the liquid L.

The implications for the achievable pixel rate were investigated in more detail. To that end the transfer function of the measurement system was determined by application of a noise signal modulating the cantilever amplitude, in the relevant frequency range up to the cantilever resonance frequency. The elements which contribute to the transfer function are the cantilever dynamics and the lock-in amplifier used to measure the cantilever amplitude. Thus, limiting factors that may show up in the final spectrum are:
- limited frequency content of input
- limited cantilever dynamics
- limited bandwidth of lock-in Noise input on the amplitude was generated by scanning a rough surface. The small features on the sample modulate the cantilever amplitude when the tip is scanned over them and thus they provide a noise input with a flat spectrum, up to some frequency which is determined by the smallest feature size on the sample and the scanning speed.

Figure 6A:
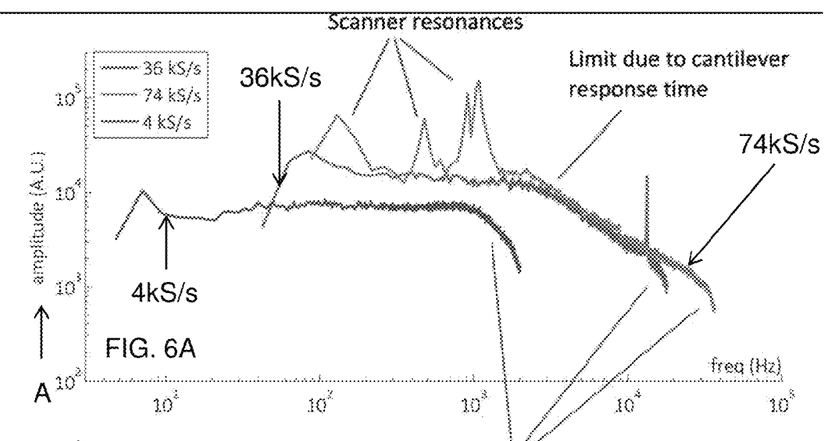
FIG. 6A shows a measured frequency spectrum, for a scanning probe microscope not according to the invention, with a horizontal logarithmic scale indicating a frequency in a range from 1 Hz to 100 kHz, and a vertical logarithmic scale indicating an amplitude from $10^2$ to $3.10^5$ in relative units.
Figure 6B:
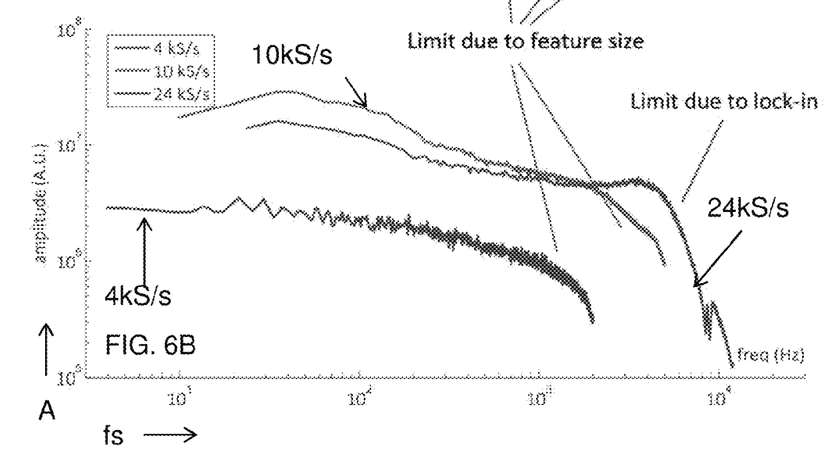
FIG. 6B shows a measured frequency spectrum, for a scanning probe microscope according to the first aspect of the invention, with a horizontal logarithmic scale indicating a frequency in a range from 1 Hz to 100 kHz, and a vertical logarithmic scale indicating an amplitude from $10^5$ to $10^8$ in relative units.

Results of these measurements are shown in FIG. 6A for the cantilever damped by air and in FIG. 6B for the cantilever damped by water. FIG. 6A shows measurements performed in air at sample rates of 4, 36 and 74 kS/s (kilosamples per second). At 2048 pixels per line and 30 µm scanning area, this corresponds to line rates of 1, 9 and 18.5 s$^{-1}$ or speeds of 60, 540 and 1110 µm.s$^{-1}$. The amplitude (A) is shown as a function of the frequency (fs).

FIG. 6B shows measurements performed in water at sample rates of 4, 10 and 24 kS/s. Using also 2048 pixels per line and 30 µm scanning area, this corresponds to line rates of 1.25, 2.5 and 6 s$^1$ or speeds of 75, 150 and 360 µm.s$^{-1}$. In FIG. 6A, it was observed that at a sample rate R of 4 kS/s, a substantially flat frequency spectrum was obtained in the range of about 6 to about 1000 Hz. When increasing the sample rate R to 36 kS/s, a substantially flat frequency spectrum was obtained in the range of about 50 Hz to about 4200 Hz. When further increasing the sample rate R to 74 kS/s, the frequency spectrum shows prominent resonances in the range of about 80 Hz and 2000 Hz, and still clearly declines beyond about 4200 Hz.

These measurements are summarized in the following table

| N | v(mm/s) | R(kS/s) | fd(kHz) | fexp(kHz) | max(kHz) | Size (nm) |
|---|---|---|---|---|---|---|
| 1 | 0.06 | 4 | 1 | 1 | 75 | 60 |
| 2 | 0.54 | 36 | 4.2 | 9 | 75 | 129 |
| 3 | 1.11 | 74 | 4.2 | 18.5 | 75 | 264 |

The second column of the table shows the speed with which the surface of the sample is scanned. The third column shows the sample frequency in kS/s. The fourth column shows the highest frequency of the spectrum of the moving sample that can still be meaningfully observed. The fifth column shows the value of this frequency that is expected on the basis of the relation $$f\exp = \frac{v}{0.06} * fd(v = 0.06)$$

The sixth column shows the value of the maximum possible observable frequency, being the resonance frequency of the cantilever. It can be seen that an increase of the scanning speed from 0.06 to 0.54 mm/s is expected to result in an increase of the highest observed frequency fd from 1 kHz to 9 kHz on the basis of a linear relation between those two. However as becomes apparent from the observations, the actually observed maximum frequency is substantially lower, i.e. implying that detailed information of the sample is lost when increasing the scanning speed to 0.54 mm/s. At a further increase of the scanning speed to 1.11 mm/s the actually observed maximum frequency does not increase further at all, implying an even further loss of information. The table also shows in a seventh column the approximate size (Size) of details that is still detectable. This is calculated as follows.

$$Size = \frac{R}{fd} d_p$$

Therein $d_p$ is the pixel size, here 15 nm.

Similar measurements were performed for the cantilever damped by water instead of by air. The results are shown in FIG. 6B, and summarized in the table below.

| N | v(mm/s) | R(kS/s) | fd(kHz) | fexp(kHz) | max (kHz) | Size (nm) |
|---|---|---|---|---|---|---|
| 4 | 0.075 | 5 | 2.5 | 3 | 30 | 30 |
| 5 | 0.15 | 10 | 5 | 7.5 | 30 | 30 |
| 6 | 0.36 | 24 | 9.6 | 18 | 30 | 37.5 |

This second table shows that the observed maximum frequency is substantially increased, even in the first measurement in this series. I.e. with the scanning speed of 0.075 mm/s the observed maximum frequency fd equals 3 hKz, which is more than would be expected on the basis of the results obtained with air as the damping medium. When doubling the scanning speed from 0.075 mm/s to 0.15 mm/s the observed maximum frequency fd also approximately doubles. Only when further increasing the scanning speed above 0.15 mm/s the observed maximum frequency fd does not further increase significantly. Further when comparing the measurement results N=1 (air) and N=4 (water) it is concluded that observed maximum frequency fd for measurement N=1 is substantially lower as compared to the measurement N=4 than what would be expected on the basis of the difference in scanning speed. Based on this difference a maximum $$fd(N=1) = \frac{0.06}{0.075}3 = 2.400$$

would be expected

As can be seen, it was possible in these circumstances to increase the scanning speed v, without losing spatial information. The response of the apparatus is now only limited by the bandwidth of the amplitude detector, at frequencies above 10 kHz. Faster measurements of the amplitude may be performed by using a different class of amplitude detector, e.g. a peak detector, making it possible to approach the cantilever resonance frequency, here 30 kHz. It is noted that for this cantilever arrangement the damping provided by air is insufficient to achieve a quality factor Q that does not exceed 5, unless the dimensions of the cantilever very closely match the dimensions of the casing. This would however have the disadvantage that minor deviations in these dimensions already result in substantial deviations in the properties of the cantilever, in particular its quality factor Q.

The invention claimed is:

1. A scanning probe microscope comprising:
   a scanning probe comprising a flexible carrier, the flexible carrier having a movable part provided with a tip,
      a holder for holding a sample in an environment free from liquid,
      a scanning arrangement for inducing a relative motion of said scanning probe with respect to said sample along a surface of said sample,
      a driver to generate a drive signal to induce an oscillating motion of said scanning probe relative to said surface,
      a measuring unit to measure a deflection of the scanning probe, and to provide a deflection signal indicative for said deflection;
      an amplitude detector to detect an amplitude of said oscillating motion as indicated by the deflection signal and to provide an amplitude signal indicative for said amplitude,
      said scanning probe being accommodated in a casing comprising a liquid to dampen motion of said scanning probe, the uncontrolled scanning probe therewith having a quality factor which is less than or equal than 5, said tip of said scanning probe extending through an opening in said casing.

2. The scanning probe microscope according to claim 1, further comprising a positioning unit for positioning said scanning probe in a direction transverse to said surface.

3. The scanning probe microscope according to claim 2, further comprising a feedback unit to provide a control signal for controlling said positioning unit in order to minimize deviations in an amplitude of oscillating motion based on said amplitude signal and a reference signal.

4. The scanning probe microscope according to claim 1, wherein an inner surface of the casing near the opening has a relatively large positive surface tension for said liquid in comparison to a remainder of said inner surface.

5. The scanning probe microscope according to claim 1, wherein said casing includes a second opening for insertion of the liquid.

6. A method of operating a scanning probe microscope comprising:
   accomodating a scanning probe in a casing comprising a liquid, to dampen motion of said scanning probe, the scanning probe therewith having a quality factor which is less than or equal than 5, the scanning probe comprising a flexible carrier, the flexible carrier having a movable part provided with a tip, which tip extends through an opening in said casing,
   holding a sample in an environment free from liquid,
   inducing a relative motion of a scanning probe with respect to a sample along a surface of said sample,
   inducing an oscillating motion of said scanning probe relative to said surface,
   measuring a deflection of the scanning probe,
   detecting an amplitude of said oscillating motion as indicated by the deflection signal.

7. The method of operating a scanning probe microscope according to claim 6, further comprising the step of providing a control signal for controlling a position of the scanning probe in order to minimize deviations in an amplitude of oscillating motion based on said detected amplitude and a reference value for said amplitude.

* * * * *